US006959546B2

(12) United States Patent
Corcoran

(10) Patent No.: US 6,959,546 B2
(45) Date of Patent: Nov. 1, 2005

(54) METHOD AND APPARATUS FOR ENERGY GENERATION UTILIZING TEMPERATURE FLUCTUATION-INDUCED FLUID PRESSURE DIFFERENTIALS

(76) Inventor: Craig C. Corcoran, 5806 N. Polk Dr., Kansas City, MO (US) 64151-2690

( * ) Notice: Subject to any disclaimer, the term of this patent is extended or adjusted under 35 U.S.C. 154(b) by 0 days.

(21) Appl. No.: 10/121,783

(22) Filed: Apr. 12, 2002

(65) Prior Publication Data

US 2003/0192315 A1 Oct. 16, 2003

(51) Int. Cl.⁷ .............................................. F01B 29/10
(52) U.S. Cl. ........................... 60/517; 60/645; 60/670
(58) Field of Search .......................... 60/517, 670, 676, 60/645; 91/415

(56) References Cited

U.S. PATENT DOCUMENTS

| | | | |
|---|---|---|---|
| 3,151,250 A | 9/1964 | Carlson | 290/52 |
| 3,523,192 A | 8/1970 | Lang | 290/52 |
| 3,643,426 A | 2/1972 | Janelid | 60/39.02 |
| 3,654,759 A | 4/1972 | Abbot | 60/26 |
| 3,744,245 A | 7/1973 | Kelly | |
| 3,763,744 A | * 10/1973 | Fournell et al. | 91/20 |
| 3,911,678 A | * 10/1975 | Shafer et al. | 60/400 |
| 3,975,914 A | * 8/1976 | Tufts et al. | 60/673 |
| 4,002,032 A | 1/1977 | Bash | 60/641 |
| 4,028,008 A | 6/1977 | Shelton | 417/52 |
| 4,031,702 A | 6/1977 | Burnett et al. | 60/398 |
| 4,091,622 A | 5/1978 | Marchesi | 60/641 |
| 4,094,146 A | 6/1978 | Schweitzer | 60/641 |
| 4,100,745 A | 7/1978 | Gyarmathy et al. | 60/652 |
| 4,132,505 A | * 1/1979 | Schuman | 417/207 |
| 4,150,547 A | 4/1979 | Hobson | 60/659 |
| 4,167,856 A | 9/1979 | Seidel et al. | 60/641 |

(Continued)

FOREIGN PATENT DOCUMENTS

| | | |
|---|---|---|
| GB | 2075608 | 11/1981 |
| JP | 54105606 | 8/1979 |
| JP | 55146286 | 11/1980 |

OTHER PUBLICATIONS

*Hand–Held Heat Engine*, Exploratorium, Mar. 2002—www.exploratorium.edu/snacks/hand_held/.

Primary Examiner—Hoang Nguyen
(74) Attorney, Agent, or Firm—Jesse J. Camacho; Shook, Hardy & Bacon L.L.P.

(57) ABSTRACT

A method and apparatus for producing energy is provided for generating renewable energy. Captive compressed fluid cycles between two coupled containers through a motive power source. The captive compressed fluid flows between the containers in response to a difference in the pressure of the compressed fluid within the first container compared to the pressure of the compressed fluid within the second container. This pressure differential develops as the compressed fluid within the first container experiences a temperature change of a differing percentage magnitude or direction than the compressed fluid within the second container over the same period of time. The differing percentage temperature fluctuations result as the containers are provided dissimilar exposure to natural renewable or man-made energy sources or are insulated therefrom. A continuous supply of additional compressed fluid is not required, nor is fluid routinely vented to the atmosphere.

71 Claims, 3 Drawing Sheets

U.S. PATENT DOCUMENTS

| | | | |
|---|---|---|---|
| 4,189,922 A | 2/1980 | Bellofatto | 60/641 |
| 4,206,608 A | 6/1980 | Bell | 60/698 |
| 4,208,592 A | 6/1980 | Leibow et al. | 290/52 |
| 4,237,692 A | 12/1980 | Ahrens et al. | 60/659 |
| 4,259,836 A | 4/1981 | Finckh | 60/39.33 |
| 4,262,484 A | 4/1981 | Jubb et al. | 60/641 |
| 4,280,327 A | 7/1981 | Mackay | 60/641 |
| 4,280,482 A | 7/1981 | Nilsson, Sr. | 126/430 |
| 4,285,201 A * | 8/1981 | Stewart | 60/641.2 |
| 4,304,219 A | 12/1981 | Currie | 126/422 |
| 4,318,393 A | 3/1982 | Goldstein | 126/438 |
| 4,324,229 A | 4/1982 | Risser | 126/439 |
| 4,355,508 A | 10/1982 | Blenke et al. | 60/416 |
| 4,370,559 A | 1/1983 | Langley, Jr. | 290/1 R |
| 4,382,365 A * | 5/1983 | Kira et al. | 60/675 |
| 4,388,805 A | 6/1983 | Rideout, Jr. | 60/527 |
| 4,407,129 A | 10/1983 | Johnston | 60/641.8 |
| 4,418,541 A * | 12/1983 | Russell | 60/667 |
| 4,441,028 A | 4/1984 | Lundberg | 290/52 |
| 4,475,342 A | 10/1984 | Assaf | 60/641.6 |
| 4,523,432 A | 6/1985 | Frutschi | 60/659 |
| 4,676,068 A | 6/1987 | Funk | 60/641.14 |
| 4,742,694 A * | 5/1988 | Yamanaka et al. | 62/510 |
| 4,753,079 A * | 6/1988 | Sumitomo | 60/676 |
| 4,872,307 A | 10/1989 | Nakhamkin | 60/39.02 |
| 4,878,349 A | 11/1989 | Czaja | 60/674 |
| 4,885,912 A | 12/1989 | Nakhamkin | 60/652 |
| 4,945,693 A | 8/1990 | Cooley | 52/81 |
| 5,099,648 A | 3/1992 | Angle | 60/726 |
| 5,238,372 A * | 8/1993 | Morris | 417/393 |
| 5,359,968 A * | 11/1994 | Shiraishi et al. | 123/3 |
| 5,379,589 A | 1/1995 | Cohn et al. | 260/39.59 |
| 5,448,889 A | 9/1995 | Bronicki | 60/641.14 |
| 5,495,709 A | 3/1996 | Frutschi | 60/39.55 |
| 5,509,604 A * | 4/1996 | Chung | 237/12.1 |
| 5,537,822 A | 7/1996 | Shnaid et al. | 60/659 |
| 5,634,340 A | 6/1997 | Grennan | 60/652 |
| 5,778,675 A | 7/1998 | Nakhamkin | 60/652 |
| 5,870,892 A | 2/1999 | Gamoso | 60/413 |
| 6,276,123 B1 | 8/2001 | Chen et al. | 60/39.141 |
| 6,354,672 B1 * | 3/2002 | Nakamura et al. | 303/113.1 |

* cited by examiner

METHOD AND APPARATUS FOR ENERGY GENERATION UTILIZING TEMPERATURE FLUCTUATION-INDUCED FLUID PRESSURE DIFFERENTIALS

CROSS-REFERENCE TO RELATED APPLICATIONS

Not applicable

STATEMENT REGARDING FEDERALLY SPONSORED RESEARCH OR DEVELOPMENT

Not applicable

TECHNICAL FIELD

This invention relates to the generation of energy.

BACKGROUND OF THE INVENTION

This invention relates to a method and apparatus for producing motive power and, more particularly, to a method and apparatus for generating renewable energy as captive compressed fluid cycles between two coupled containers through a motive power source. The captive compressed fluid flows between the containers in response to a difference in the pressure of the compressed fluid within the first container compared to the pressure of the compressed fluid within the second container. This pressure differential develops as the compressed fluid within the first container experiences a temperature change of a differing percentage magnitude or direction than the compressed fluid within the second container over the same period of time. The differing percentage temperature fluctuations result as the containers are provided dissimilar exposure to natural renewable or man-made energy sources or are insulated therefrom. A continuous supply of additional compressed fluid is not required, nor is fluid routinely vented to the atmosphere.

Attempts to take advantage of natural energy sources to provide useful motive power are numerous. The most common source of natural energy is the Sun. Solar panels, solar collectors, and variations thereof have been widely used to produce useful energy.

The prior art also teaches utilizing solar energy and its effects on ambient air. The ambient air is heated, giving rise to a corresponding increase in pressure. This compressed air is expanded back to ambient pressure through a motive power source. The benefits derived are limited, however, since percent increases in pressure are applied to an ambient pressure base.

The prior art also teaches utilizing solar energy and its effects on compressed air. This heated, compressed air is also expanded back to ambient pressure through a motive power source. A renewed supply of compressed air is needed to continue the process.

The prior art also teaches utilizing compressed gas or compressible fluid as a means for storing energy that can then be released when needed. It is also known to couple a subterranean pneumatic storage container with an electric generating source and utilize the underground storage container to hold energy in the form of compressed air that can then be released when desired.

The prior art also teaches utilizing an air compressor to continually repressurize a recirculating supply of air for expansion through a motive power source. The benefits derived are a direct result of and are limited by the continuous energy usage requirements of the air compressor.

None of the prior art devices generate motive power on a continuing renewable basis utilizing temperature fluctuations to cycle captive compressed fluid. Moreover, while direct solar exposure enhances the energy output of the present device, motive power can be derived in the absence of direct solar exposure from ambient heating or cooling or other sources of temperature fluctuations.

SUMMARY OF THE INVENTION

The present invention provides a renewable energy source as captive compressed medium cycles between two coupled containers through a motive power source. The captive medium can be compressible gas or a compressible mixture of gas and liquid, referred to herein as a compressed fluid, where such compression varies with temperature. It is assumed that the compressed fluid is maintained in a compressible state during anticipated operating temperatures. The captive compressed fluid flows between the containers in response to a difference in the pressure of the compressed fluid within the first container compared to the pressure of the compressed fluid within the second container. More particularly, even though the compressed fluid within both containers are consistently maintained at greater than ambient pressure during anticipated temperature ranges, the compressed fluid will flow during a fluid exchange cycle from the container of higher comparative pressure to the container of lower comparative pressure. A preferred embodiment will be described wherein the beginning pressures of the compressed fluid in the two containers are substantially equal.

The pressure differential develops between the compressed fluid within the first container relative to the compressed fluid within the second container when the first container, and, more particularly, the compressed fluid within the first container, experiences a temperature change of a differing percentage magnitude or direction than the compressed fluid within the second container over the same period of time (as previously mentioned, the containers begin in pressure equilibrium). Any relative dispositions provided for the containers that result in differing percentage temperature changes may be used, whether involving exposure to or insulation from any natural or man-made heating or cooling sources.

Natural ambient heating and cooling cycles may be used to provide periodic temperature changes, as long as the relative exposure of the containers to such ambient heating and cooling energy sources is dissimilar so that such dissimilar exposure generates a differing percentage temperature fluctuation within such containers relative to each other over the same period of time. One way that natural ambient heating and cooling cycles can be harnessed for use is by using a relatively temperature volatile environment of daily ambient temperature changes and available solar energy for heating and cooling a first container while using a relatively stable subsurface or other insulated temperature environment provided for a second container. Man-made heating and/or cooling sources may be provided to develop the desired differing percentage temperature fluctuations or supplement the effects of natural ambient heating and cooling.

Following a compressed fluid exchange cycle, additional disparate percentage temperature fluctuations, and, in turn, pressure differentials, may be achieved in a variety of ways not limited to: 1) continued exposure to natural ambient heating and cooling cycles; 2) the use of man-made heating and/or cooling sources; 3) altering or reversing either the dispositions of the respective containers or their respective environmental exposure; or 4) any combination thereof.

No fluid is vented to the atmosphere. That is, the compressed fluid is captive within the system and cycles back and forth between the containers, depending on the direction of each built-up pressure differential, but does not escape the system.

It is therefore a primary object of the present invention to provide an apparatus and method for generating energy that relies primarily upon natural renewable energy sources to create differing percentage temperature fluctuations between captive compressed fluid in at least two containers relative to each other and use the resulting pressure differential between the two containers to urge a flow of a compressed fluid that will drive a motive power source as it flows between the two containers.

One of the objects of the invention is to provide a method and apparatus for generating energy by using a relatively temperature volatile environment of daily ambient temperature changes and available solar energy for heating and cooling a first container while using a relatively stable subsurface or other insulated temperature environment provided for a second container to create pressure differentials that can be translated to energy.

Another object of the invention is to provide a method and apparatus for generating energy by using removable insulation to provide dissimilar exposure for at least two containers to daily ambient temperature changes and available solar energy to create disparate percentage temperature fluctuations, and, in turn, pressure differentials that can be translated to energy.

Another object of the invention is to provide a method and apparatus as set forth in the foregoing objects wherein the referenced containers' relative exposure to the containers' respective natural environments or insulation therefrom and/or man made heating and cooling sources is periodically altered or reversed whereby the frequency of compressed fluid exchange cycles may be increased.

Still another object of the invention is to utilize a compressed medium, which can be a compressible gas or a compressible fluid mixture of gas and liquid, so that disparate percentage temperature fluctuations of the compressed medium within the containers will result in greater absolute pressure differentials than would be the case with the medium beginning at atmospheric pressure.

Still another object of the invention is to utilize a closed system so that the compressed medium remains captive within the system, thus avoiding the need to continually repressurize or replenish the working medium.

Other objects of the invention will be made clear or become apparent from the following description and claims.

BRIEF DESCRIPTION OF THE DRAWINGS

In the accompanying drawings which form a part of the specification of the present application.

DETAILED DESCRIPTION OF THE INVENTION

Figure 1:
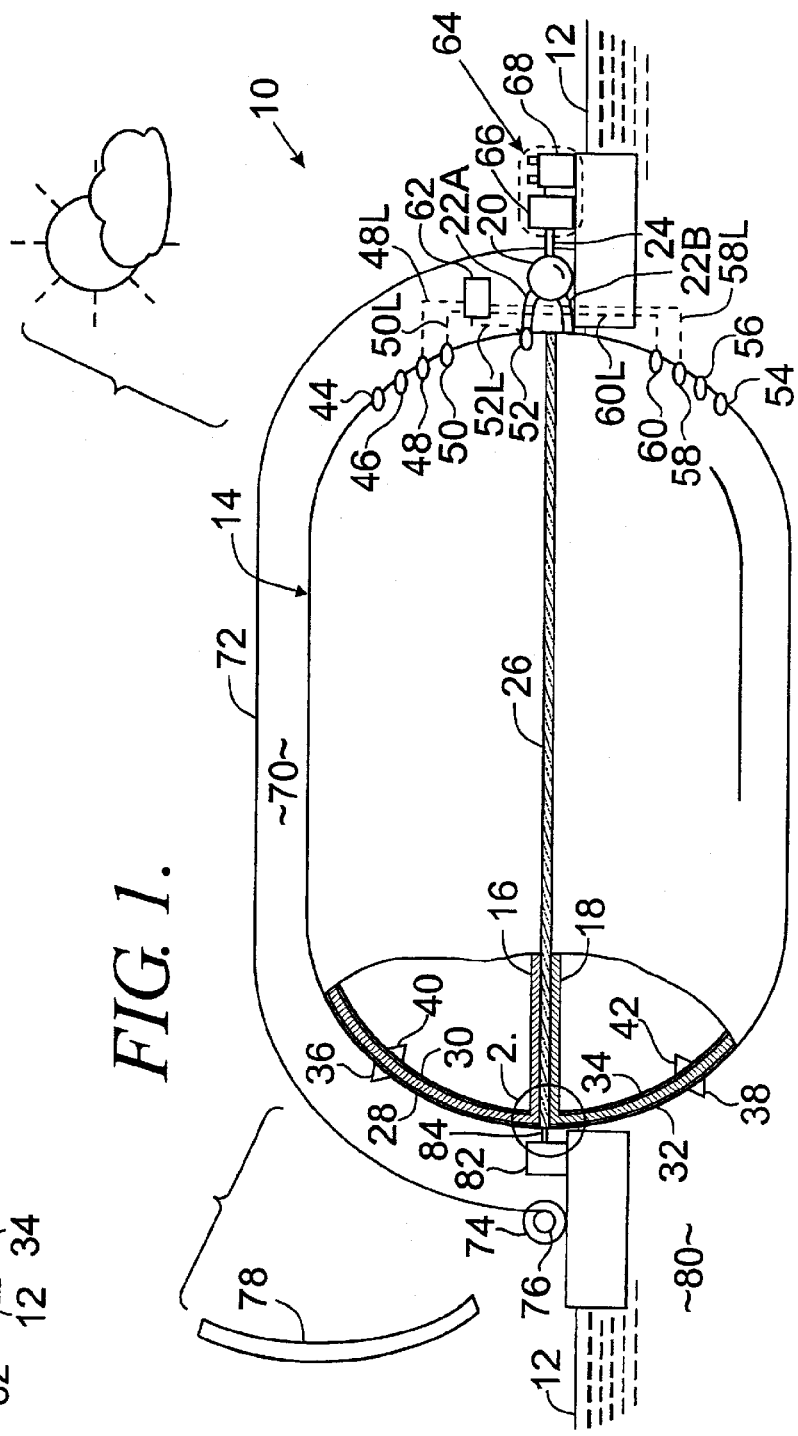
FIG. 1 is a schematic illustration of the preferred embodiment of the invention wherein two fluid storage containers comprise portions of a tank that can be periodically rotated to alternate the exposure of the containers between temperature volatile and temperature stable environments.

Referring initially to FIG. 1, the pressure differential compressed fluid exchanger according to a preferred embodiment of the present invention is designated generally by the numeral 10. The grade level of the earth is designated by the numeral 12. The preferred embodiment of the pressure differential compressed fluid exchanger 10 includes two containers that are each partitioned sections of a tank 14. More particularly, pressure differential compressed fluid exchanger 10 comprises a first container 16, a second container 18, and a motive power source coupled with the first container 16 by a first fluid coupler 22A and with the second container 18 by a second fluid coupler 22B. In this embodiment, the motive power source comprises a turbine 20 and is coupled with a turbine shaft 24. The first container 16 comprises an airtight section of the tank 14 adapted to contain pressurized fluid. Similarly, the second container 18 comprises a remaining airtight section of tank 14 and is also adapted to contain pressurized fluid. The first container 16 is separated from the second container 18 by an insulated partition 26. The first container 16 is coated by a first exterior heat conducting skin 28 and partially coated by a first interior heat conducting skin 30. Similarly, the second container 18 is coated by a second exterior heat conducting skin 32 and partially coated by a second interior heat conducting skin 34. The exterior heat conducting skins 28 and 32 are coupled with first and second exterior heat transfer appendages 36 and 38, respectively. The interior heat conducting skins 30 and 34 are coupled to first and second interior heat transfer appendages 40 and 42, respectively.

A plurality of valves and gauges are coupled with the first container 16, including a first input/exhaust valve 44, a first emergency pressure relief valve 46, a first temperature gauge 48, a first pressure gauge 50, and a pressure regulating main control valve 52 that controls the flow of compressed fluid between the first container 16 and the second container 18. Similarly, the second container 18 has coupled with it several valves and gauges, including a second input/exhaust valve 54, a second emergency pressure relief valve 56, a second temperature gauge 58, and a second pressure gauge 60. The temperature and pressure gauges along with the pressure regulating main control valve 52 are logically coupled with a computer controller 62 via the following logical connections: a first temperature link 48L, a first pressure link 50L, a second temperature link 58L, a second pressure link 60L, and a main control valve link 52L. The computer controller 62 comprises a built-in clock and manual override capability. The turbine 20 is coupled via the turbine shaft 24 with an energy storage apparatus 64. The energy storage apparatus 64 comprises a generator 66 and a battery 68.

The first container 16 is subjected to a relatively temperature volatile environment, designated generally by numeral

70. The relatively temperature volatile environment 70 is surrounded by a removable solar oven enclosure 72. A first prime mover 74 is coupled with the removable solar oven enclosure 72 via a first prime mover shaft 76. Also included as part of the pressure differential compressed fluid exchanger 10 is a solar concentrator 78 positioned in such a way as to direct sunlight toward the first container 16. The second container 18 is placed in a relatively temperature stable environment, designated generally by numeral 80. As shown, the relatively temperature stable environment 80 comprises a body of water. A second prime mover 82 is coupled with tank 14 via a second prime mover shaft 84.

Figure 2:
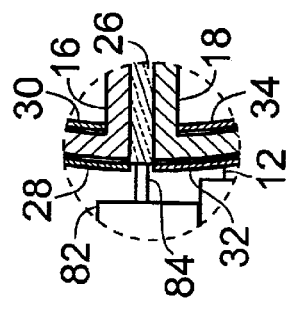
FIG. 2 is a magnified illustration of a portion of the preferred embodiment of the invention.

FIG. 2 is a magnified view of a portion of the preferred embodiment offered for illustration purposes.

In operation, the pressure differential compressed fluid exchanger 10 invention provides a renewable energy source as captive compressed fluid cycles between the first container 16 and the second container 18 through turbine 20. The captive compressed fluid flows between the first container 16 and the second container 18 in response to a difference in the pressure of the compressed fluid within first container 16 compared to the pressure of the compressed fluid within second container 18. More particularly, when a pressure differential develops sufficient to operate the motive power source where the pressure of the compressed fluid within the first container 16 is greater than the pressure of the compressed fluid within the second container 18 and the pressure regulating main control valve 52 is opened, the compressed fluid will flow from the first container 16 through the pressure regulating main control valve 52 through the first fluid coupler 22A through the turbine 20 through the second fluid coupler 22B and into the second container 18. Conversely, when a pressure differential develops sufficient to operate the motive power source where the pressure of the compressed fluid within the second container 18 is greater than the pressure of the compressed fluid within the first container 16 and the pressure regulating main control valve 52 is opened, the compressed fluid will flow from the second container 18 through the second fluid coupler 22B through the turbine 20 through the first fluid coupler 22A through the pressure regulating main control valve 52 and into the first container 16. It is understood that the motive power source, here turbine 20, can be any device adapted to respond to the flow of fluid that is used to do work or generate energy.

It is assumed that the compressed fluid flows during each compressed fluid exchange cycle until the difference in the pressure of the compressed fluid within in first container 16 compared to the pressure of the compressed fluid within the second container 18 is no longer sufficient to operate the turbine 20.

The pressure differential develops between the compressed fluid within the first container 16 relative to the compressed fluid within the second container 18 when the first container 16, and, more particularly, the compressed fluid within the first container 16, experiences a temperature change of a differing percentage than the compressed fluid within the second container 18 over the same period of time.

Captive fluid, referring herein to a captive fluid behaving consistent with PV=nRT, reacts to a change in temperature with a corresponding change in pressure. More particularly, all other things held constant, a given percentage change in the temperature of such a captive fluid gives rise to a corresponding percentage change in pressure. This percentage change in temperature is a calculation referenced from absolute zero. For instance, all other things held constant, such a captive fluid that experiences a rise in temperature of 10%, such as from 290 degrees Kelvin to 319 degrees Kelvin, can give rise to a 10% increase in the pressure of such captive fluid. Assuming that the pressures in the first container 16 and the second container 18 begin in pressure equilibrium, and all other things held constant, such as the volumes of the respective containers, a pressure differential resulting from a differing percentage temperature change can be developed between the compressed fluid within the first container 16 and the compressed fluid within the second container 18 in a number of ways, for example by: 1) a temperature rise in the compressed fluid within the first container 16 while the compressed fluid within the second container 18 experiences a temperature decrease; 2) a temperature decrease in the compressed fluid within the first container 16 while the compressed fluid within the second container 18 experiences a temperature rise; 3) a temperature rise in the compressed fluid within the first container 16 while the compressed fluid within the second container 18 experiences neither a temperature increase or decrease; 4) a temperature decrease in the compressed fluid within the first container 16 while the compressed fluid within the second container 18 experiences neither a temperature increase or decrease; 5) a temperature rise in the compressed fluid within the second container 18 while the compressed fluid within the first container 16 experiences neither a temperature increase or decrease; 6) a temperature decrease in the compressed fluid within the second container 18 while the compressed fluid within the first container 16 experiences neither a temperature increase or decrease; 7) a temperature rise in both the compressed fluid within the first container 16 and the compressed fluid within the second container 18, but by disparate percentages; or 8) a temperature decrease in both the compressed fluid within the first container 16 and the compressed fluid within the second container 18, but by disparate percentages.

Natural ambient heating and cooling cycles may be used to provide periodic temperature changes, as long as the relative exposure of the first container 16 compared to the second container 18 to such ambient heating and cooling energy sources is dissimilar so that such dissimilar exposure generates a differing percentage temperature fluctuation over the same period of time. Natural ambient heating and cooling cycles are harnessed in this preferred embodiment for use by using a relatively temperature volatile environment 70 of daily ambient temperature changes and available solar energy for heating and cooling one of the two containers, in the case of FIG. 1, the first container 16, while using a relatively temperature stable environment 80 provided for the other of the two containers, in the case of FIG. 1, the second container 18. It will be discussed later that, in the case of the preferred embodiment, the capability is included to alternate the respective containers' exposure between the relatively temperature volatile environment 70 and relatively temperature stable environment 80.

The pressure differential compressed fluid exchanger 10 will operate under a myriad of natural ambient heating and cooling cycle operating scenarios. Following is a prophetic example of an illustrative 24-hour period and environmental characteristics ("illustrative day") of the preferred embodiment and is designed with a set of delineated assumptions; while other considerations are omitted. The following are the assumed temperatures within the relatively temperature volatile environment 70 and the relatively temperature stable environment 80:

|  |  |  | Temperature (degrees Kelvin) | |
|---|---|---|---|---|
| _____ | Time of day | _____ | Relatively Temperature | Relatively Temperature |
| From | At | To | Volatile Environment 70 | Stable Environment 80 |
|  | 10:00 a.m. |  | 290 | 290 |
| 10:01 a.m. |  | 6:00 p.m. | 420 | 290 |
| 6:01 p.m. |  | 9:59 a.m. | 305 | 290 |

There are alternatives to charging the pressure differential compressed fluid exchanger 10 with compressed fluid. In regard to this prophetic example, it is assumed that the first container 16 and the second container 18, via the first input/exhaust valve 44 and the second input/exhaust valve 54, respectively, are partially or completely filled with fluid that is below both the fluid's liquefaction temperature and anticipated operating temperatures. It is assumed that such fluid then adjusts to the temperatures of the first environment 70 and the second environment 80 with an assumed phase change from liquid to compressed gas, referred to hereinafter as compressed fluid. Fluid is pressurized into the system to increase the mass of fluid within the system, thereby increasing the potential volume of fluid exchanged during a given exchange cycle, and consequently, the amount of energy generated. Moreover, by initially compressing the fluid in the pressure differential compressed fluid exchanger 10 to above atmospheric pressure, the absolute pressure differential for a given differing percentage temperature change will be greater than if the containers were initially at atmospheric pressure. That is, applying a given percentage change to a greater than atmospheric pressure base can result in a greater absolute change in pressure than the same percentage applied to a lesser, atmospheric pressure base. It is assumed that the first container 16 and the second container 18 are initially provided with fluid at substantially equal pressures. The pressure differential compressed fluid exchanger 10 is designed to require this fluid injection procedure only once, although additional injections or ventilations may be subsequently necessary as operating conditions dictate or to remedy the effects of normal wear and tear. This initial charging of the first container 16 and the second container 18 with compressed fluid is assumed to take place by 10:00 a.m. on this illustrative day. With the pressure regulating main control valve 52 closed, the compressed fluid within the first container 16 is isolated from the compressed fluid within the second container 18.

As this illustrative day progresses past 10:00 a.m., a differing percentage temperature change occurs as the temperature of the relatively volatile environment 70 rises from 290 degrees Kelvin to 420 degrees Kelvin while the temperature of the compressed fluid within the second container 18 remains steady. It is assumed that this aforementioned differing percentage temperature change takes place between 10:01 a.m. and 10:59 a.m. on this illustrative day. All other things held constant, including the expansion or contraction of the first container 16, it is assumed that this differing percentage temperature change results in a pressure differential between the compressed fluid within the first container 16 relative to the compressed fluid within the second container 18. More particularly, it is assumed that the pressure of the compressed fluid within the first container 16 will be greater than the pressure of the compressed fluid within the second container 18. It is assumed that the pressure differential is sufficient to operate the motive power source.

The temperature of the compressed fluid inside of the first container 16 is monitored by the first temperature gauge 48 and the pressure of the compressed fluid within first container 16 is monitored by the first pressure gauge 50. Similarly, the second temperature gauge 58 and the second pressure gauge 60 monitor the temperature and pressure inside of the second container 18. The computer controller 62 accepts as inputs, via respective logical connections, the data from each of the four gauges listed above, along with time of day or other available information, to intelligently control the pressure regulating main control valve 52. When desired, whether automatically or via manual override, the computer controller 62 opens the pressure regulating main control valve 52 and compressed fluid flows from the first container 16 through the turbine 20 and into the second container 18. As the compressed fluid flows through the turbine 20, the turbine shaft 24 coupled with the turbine 20 rotates. This rotating turbine shaft 24 can be coupled with a variety of energy producing devices well known in the art such as the electrical generator 66 to use the energy produced. Alternatively, the turbine shaft 24 can be connected to the energy storage apparatus 64 to produce and store the electrical energy generated to be used at a later time. The fluid is assumed to flow until the difference in the pressure of the compressed fluid within in first container 16 compared to the pressure of the compressed fluid within the second container 18 is no longer sufficient to operate the motive power source. The pressure regulating main control valve 52 is subsequently closed to mark the end of the compressed fluid exchange cycle. It is assumed that this aforementioned compressed fluid exchange takes place between 11:00 a.m. and 2:00 p.m. on this illustrative day.

As discussed, with the rotation of the turbine 20, the aforementioned hypothetical compressed fluid exchange would result in the generation of energy. In order to approximate this energy generation, several assumptions are employed. It is assumed that the compressed fluid within the first container 16 and the second container 18 could be initially provided by substantially filling the first container 16 and the second container 18 with liquid nitrogen. It is assumed that the liquid nitrogen then adjusts to the approximate temperatures of the first environment 70 and the second environment 80, with an assumed phase change from liquid to compressed gas and assumed beginning pressures of the resultant compressed fluid within the first container 16 and the second container 18 of approximately 69 million newtons per square meter each. It is assumed that the compressed fluid within the first container 16 and the second container 18 could behave consistent with PV=nRT. It is assumed that the useful internal volumes of the first container 16 and the second container 18 could be designed at approximately 12 thousand cubic meters each. It is assumed that any expansion or contraction of the first container 16 or the second container 18 throughout the range of pressures and temperatures employed in this approximation would be insignificant. That is, it is assumed that the first container 16 and the second container 18 could maintain approximately constant useful internal volumes. It is assumed that the aforementioned rise in temperature of the first environment 70 from 290 degrees Kelvin to 420 degrees Kelvin would result in an increase in the temperature of the compressed fluid within the first container 16, in turn, to approximately 420 degrees Kelvin, with an assumed corresponding pressure increase from approximately 69 million newtons per square meter to approximately 100 million newtons per square meter. It is assumed that the turbine 20 would require a threshold pressure differential of approximately 1 million newtons per square meter to allow a compressed fluid exchange to initiate. An approximate like amount of pressure differential is assumed to remain when the pressure differential is no longer sufficient to operate the turbine 20 and, therefore, the compressed fluid exchange would end. Under these assumptions and all other things held constant, it is assumed that, once initiated, the aforementioned hypothetical compressed fluid exchange would continue until the pressures of the compressed fluid within the first container 16 and the compressed fluid within the second container 18 approximate 85 million newtons per square meter and 84 million newtons per square meter, respectively, resulting in approximately 50 megawatt-hours of energy passing to the turbine 20. The amount of energy delivered as output from the turbine 20 would depend on the efficiency of the turbine 20.

As this illustrative day progresses past 2:00 p.m., the second prime mover 82 and the second prime mover shaft 84 are used to rotate tank 14. This rotation of tank 14 reverses the relative exposure of the first container 16 and the second container 18. The second container 18 becomes exposed to the relatively temperature volatile environment 70 and the first container 16 becomes exposed to the relatively temperature stable environment 80. It is assumed that the compressed fluid within the second container 18 adjusts to the temperature of the relatively temperature volatile environment 70, adjusting from 290 degrees Kelvin to 420 degrees Kelvin. It is assumed that the compressed fluid within the first container 16 adjusts to the temperature of the relatively temperature stable environment 80, adjusting from 420 degrees Kelvin to 290 degrees Kelvin. It is assumed that this second differing percentage temperature change takes place between 2:01 p.m. and 2:59 p.m. on this illustrative day. It is assumed that this differing percentage temperature change results in a pressure differential between the compressed fluid within the first container 16 and the compressed fluid within the second container 18. More particularly, in this case, it is assumed that the pressure of the compressed fluid within the second container 18 will be greater than the pressure of the compressed fluid within the first container 16. It is assumed that the pressure differential is sufficient to operate the motive power source. Similar to that described previously, the computer controller 62 opens the pressure regulating main control valve 52 and compressed fluid flows from the container of relatively higher pressure to the container of relatively lower pressure. In this case, compressed fluid flows from the second container 18 through the turbine 20 and into the first container 16. As before, as the compressed fluid flows through the turbine 20, the turbine shaft 24 rotates, generating energy. The fluid is assumed to flow until the difference in the pressure of the compressed fluid within in first container 16 compared to the pressure of the compressed fluid within the second container 18 is no longer sufficient to operate the motive power source. The pressure regulating main control valve 52 is again closed to mark the end of this second compressed fluid exchange cycle. It is assumed that this second compressed fluid exchange takes place between 3:00 p.m. and 6:00 p.m. on this illustrative day.

As this illustrative day progresses past 6:00 p.m., a differing percentage temperature change occurs as the temperature of the relatively volatile environment 70 decreases from 420 degrees Kelvin to 305 degrees Kelvin, while the temperature of the relatively stable environment 80 remains at 290 degrees Kelvin. It is assumed that this third differing percentage temperature change takes place between 6:01 p.m. and 6:59 p.m. on this illustrative day. It is assumed that this differing percentage temperature change results in a pressure differential between the compressed fluid within the second container 18, situated within the relatively volatile environment 70, relative to the compressed fluid within the first container 16, situated within the relatively stable environment 80. More particularly, in this case, it is assumed that the pressure of the compressed fluid within the second container 18 will be less than the pressure of the compressed fluid within the first container 16. It is assumed that the pressure differential is sufficient to operate the motive power source. Similar to that described previously, the computer controller 62 opens the pressure regulating main control valve 52 and compressed fluid flows from the container of relatively higher pressure to the container of relatively lower pressure. In this case, compressed fluid flows from the first container 16 through the turbine 20 and into the second container 18. As before, as the compressed fluid flows through the turbine 20, the turbine shaft 24 rotates, generating energy. The fluid is assumed to flow until the difference in the pressure of the compressed fluid within in first container 16 compared to the pressure of the compressed fluid within the second container 18 is no longer sufficient to operate the motive power source. The pressure regulating main control valve 52 is again closed to mark the end of this third compressed fluid exchange cycle. It is assumed that this third compressed fluid exchange takes place between 7:00 p.m. and 10:00 p.m. on this illustrative day.

The remainder of the operations of the pressure differential compressed fluid exchanger 10 during the rest of this illustrative day is omitted because of its similar operation. No fluid is vented to the atmosphere as a result of the operations of the pressure differential compressed fluid exchanger 10 during the illustrative day. That is, compressed fluid cycles back and forth between the first container 16 and the second container 18, depending on the direction of the built-up pressure differential, but does not escape the system.

The example operational scenario was based and dependent on the example temperatures of the respective environments. Most particularly, the rotation of the tank 14 may not provide the opportunity to increase the frequency of the compressed fluid exchange cycles unless the respective temperatures of the relatively temperature volatile environment 70 and the relatively temperature stable environment 80 are conducive to the development of additional pressure differentials ahead of natural ambient heating and cooling cycles. This illustrative day is not meant to encompass all operating scenarios in which the pressure differential compressed fluid exchanger 10 will function. Moreover, the above approximation of the assumed hypothetical compressed fluid exchange is not meant to encompass the entire range of energy generation theoretically attainable from the operations of this invention.

To permit energy generated from a compressed fluid exchange cycle to be used at a later time, energy storage apparatus 64 is coupled to the turbine 20 via the turbine shaft 24. Turbine 20 powers a generator 66 and a battery 68. The battery 68 can then be used as desired.

The relatively temperature volatile environment 70 is surrounded by the removable solar oven enclosure 72. The first prime mover 74 is coupled with the removable solar oven enclosure 72 via the first prime mover shaft 76. The first prime mover 74 is included to remove or replace, as desired, the removable solar oven enclosure 72. This removable solar oven enclosure 72 serves, when present, to allow the penetration of sunlight and the related capture of heat within the relatively temperature volatile environment 70, or, when removed, the venting of the relatively temperature volatile environment 70. The solar concentrator 78 is used to direct additional available sunlight toward the relatively temperature volatile environment 70.

It is understood that the containers, referring to the first container 16 and the second container 18, do not have to be part of a unified structure in order to provide for rotation or to otherwise alter or reverse their respective environmental exposure. Moreover, any means provided wherein the containers' relative exposure to the containers' respective environments is periodically altered or reversed may increase the frequency of compressed fluid exchange cycles. Alternatively, the means for rotation of or to otherwise alter the containers respective environmental exposure is optional.

Although not illustrated, the computer controller 62 could be linked to the second prime mover 82 for controlling the rotation of tank 14 and/or to the first prime mover 74 for removal or replacement of the removable solar oven enclosure 72.

The preferred embodiment illustrates the relatively temperature stable environment 80 as a body of water. It is understood that any environment that provides for relative temperature stability as compared to the relatively temperature volatile environment 70 can be used. Should the relatively temperature stable environment 80 comprise a body of water, it is understood that floats, weights, or other anchoring means may or may not be necessary to adjust buoyancy to a desired amount such that tank 14 will reside in such body of water at a desired level. If rotation of the containers is desired, as is illustrated and described in the preferred embodiment, alternatives to a body of water exist, such as but not limited to insulation or an air gap or liquid layer or rolling means provided between the tank 14 and the earth.

The insulated partition 26 could be made of any suitable material to provide insulation between the first container 16 and the second container 18 or is optional. Alternatively, the insulated partition 26 can be an air gap or liquid layer, with or without the means to circulate such air or liquid.

Figure 3:
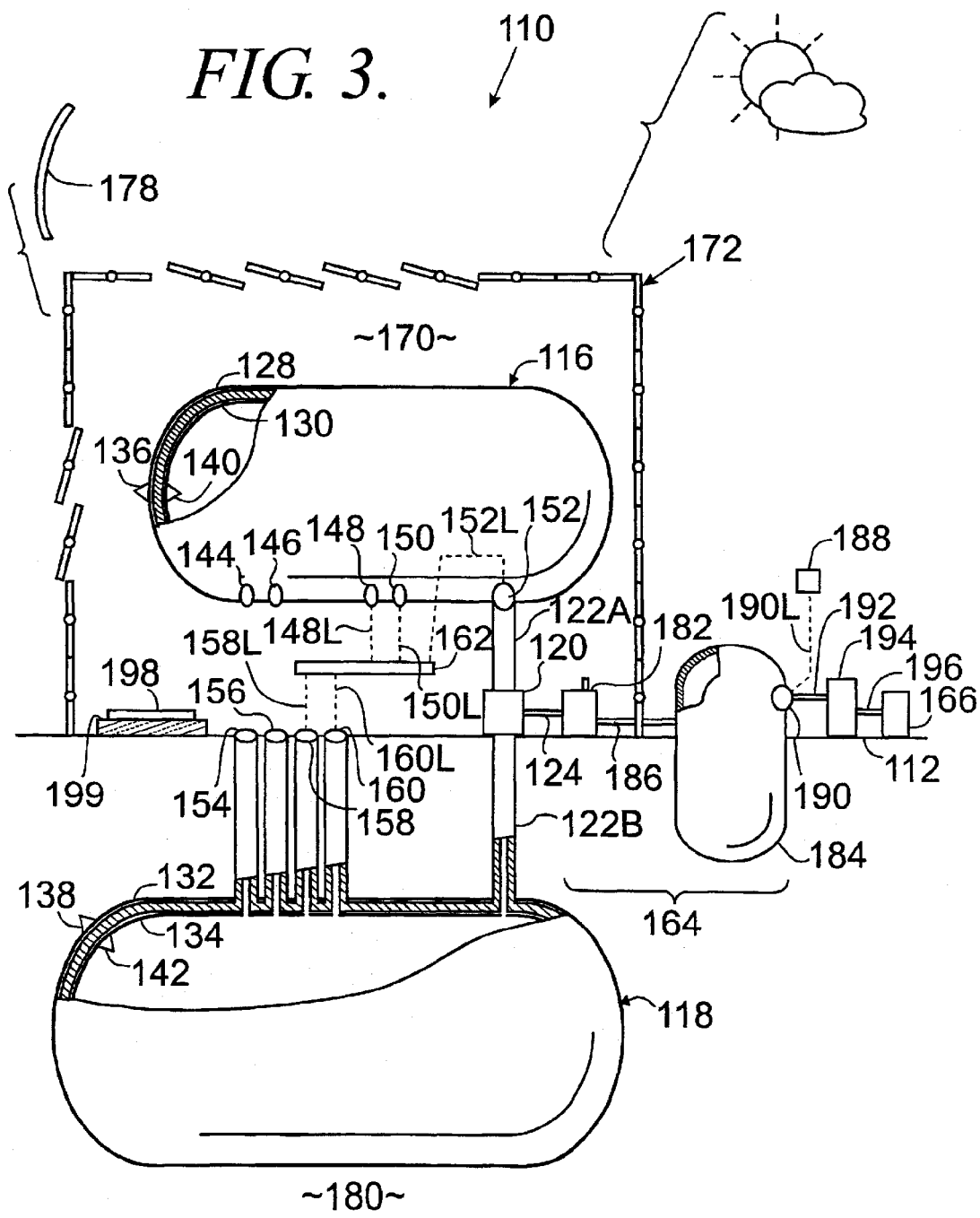
FIG. 3 is a partially schematic, elevational view of an alternative embodiment of the apparatus of the present invention showing first and second containers at above ground and below ground locations along with an optional energy storage tank.

Referring now to FIG. 3, the pressure differential compressed fluid exchanger according to an alternative embodiment of the present invention is designated generally by the numeral 110. The grade level of the earth is designated by the numeral 112. The alternative embodiment pressure differential compressed fluid exchanger 110 comprises a first container 116, a second container 118, and a motive power source coupled with the first container 116 by a first fluid coupler 122A and with the second container 118 by a second fluid coupler 122B. In this alternative embodiment, the motive power source comprises a turbine 120 and is coupled with a turbine shaft 124. The first container 116 comprises an airtight tank adapted to contain pressurized fluid. Similarly, the second container 118 comprises an airtight tank and is also adapted to contain pressurized fluid. The first container 116 is coated by a first exterior heat conducting skin 128 and a first interior heat conducting skin 130. Similarly, the second container 118 is coated by a second exterior heat conducting skin 132 and a second interior heat conducting skin 134. The exterior heat conducting skins 128 and 132 are coupled with first and second exterior heat transfer appendages 136 and 138, respectively. The interior heat conducting skins 130 and 134 are coupled with first and second interior heat transfer appendages 140 and 142, respectively.

A plurality of valves and gauges are coupled with the first container 116, including a first input/exhaust valve 144, a first emergency pressure relief valve 146, a first temperature gauge 148, a first pressure gauge 150, and a pressure regulating main control valve 152 that controls the flow of compressed fluid between the first container 116 and the second container 118. Similarly, the second container 118 has coupled with it several valves and gauges, including a second input/exhaust valve 154, a second emergency pressure relief valve 156, a second temperature gauge 158, and a second pressure gauge 160. The temperature and pressure gauges along with the pressure regulating main control valve 152 are logically coupled with a first computer controller 162 via the following logical connections: a first temperature link 148L, a first pressure link 150L, a second temperature link 158L, a second pressure link 160L, and a main control valve link 152L. The first computer controller 162 comprises a built-in clock and manual override capability.

The turbine 120 is coupled via the turbine shaft 124 with an energy storage apparatus bracketed in FIG. 3 and designated generally by reference numeral 164. The energy storage apparatus 164 comprises an air compressor 182 coupled to a third container 184 via a third fluid coupler 186. The third container 184 is adapted to contain, and more particularly, accept and store compressed air. A second computer controller 188 is coupled with a release valve 190 of the third container 184 via a logical connection 190L. Coupled with the third container 184 at the release valve 190 by a fourth fluid coupler 192 is a second turbine 194 that is, in turn, coupled via a second turbine shaft 196 to a generator 166.

In this alternative embodiment, the first container 116 is subjected to a relatively temperature volatile environment, designated generally by numeral 170. The relatively temperature volatile environment 170 is surrounded by a solar oven enclosure 172 comprised of rotatable glass panels. Also included as part of the fluid exchanger is a solar concentrator 178 positioned in such a way as to reflect and concentrate sunlight towards the first container 116. A layer of heat radiant material 198, insulated from the ground 112 with an insulation layer 199, extends underneath the first container 116. The second container 118 is placed in a separate below ground relatively temperature stable environment designated generally by numeral 180.

In operation, the pressure differential compressed fluid exchanger 110 invention provides a renewable energy source as captive compressed fluid cycles between the first container 116 and the second container 118 through turbine 120. The captive compressed fluid flows between the first container 116 and the second container 118 in response to a difference in the pressure of the compressed fluid within the first container 116 compared to the pressure of the compressed fluid within the second container 118.

It is assumed that the compressed fluid flows during each compressed fluid exchange cycle until the difference in the pressure of the compressed fluid within in first container 116 compared to the pressure of the compressed fluid within the second container 118 is no longer sufficient to operate the motive power source.

The pressure differential develops between the compressed fluid within the first container 116 relative to the compressed fluid within the second container 118 when the first container 116, and, more particularly, the compressed fluid within the first container 116, experiences a temperature change of a differing percentage than the compressed fluid within the second container 118 over the same period of time.

Natural ambient heating and cooling cycles are harnessed in this alternative embodiment for use by providing a relatively temperature volatile environment 170 of daily ambient temperature changes and available solar energy for heating and cooling the first container 116 while providing a relatively temperature stable environment 180 for the second container 118.

The pressure differential compressed fluid exchanger 110 will operate under a myriad of natural ambient heating and cooling cycle operating scenarios. Following is another prophetic example of an illustrative 24-hour period and environmental characteristics ("illustrative day") of this alternative embodiment and is designed with a set of delineated assumptions; while other considerations are omitted. The following are the assumed temperatures within the relatively temperature volatile environment 170 and the relatively temperature stable environment 180:

temperature of the compressed fluid within the second container 118 remains steady. It is assumed that this differing percentage temperature change takes place between 9:01 a.m. and 1:59 p.m. on this illustrative day. All other things held constant, including the expansion or contraction of the first container 116, it is assumed that this differing percentage temperature change results in a pressure differential between the compressed fluid within the first container 116 relative to the compressed fluid within the second container 118. More particularly, it is assume that the pressure of the compressed fluid within the first container 116 will be greater than the pressure of the compressed fluid within the second container 118. It is assumed that the pressure differential is sufficient to operate the motive power source.

The temperature of the compressed fluid inside of the first container 116 is monitored by the first temperature gauge 148 and the pressure of the compressed fluid within first container 116 is monitored by the first pressure gauge 150. Similarly, the second temperature gauge 158 and the second pressure gauge 160 monitor the temperature and pressure inside of the second container 118. The computer controller 162 accepts as inputs, via respective logical connections, the data from each of the four gauges listed above, along with time of day or other available information, to intelligently control the pressure regulating main control valve 152. When desired, whether automatically or via manual override, the computer controller 162 opens the pressure regulating main control valve 152 and compressed fluid flows from the first container 116 through the turbine 120

| Time of day | | | Temperature (degrees Kelvin) | |
|---|---|---|---|---|
| From | At | To | Relatively Temperature Volatile Environment 170 | Relatively Temperature Stable Environment 180 |
| | 9:00 a.m. | | 275 | 290 |
| 9:01 a.m. | | 9:00 p.m. | 290 | 290 |
| 9:01 p.m. | | 8:59 a.m. | 275 | 290 |

To initially charge the system with compressed fluid, ambient fluid is initially compressed into the first container 116 and the second container 118 via the first input/exhaust valve 144 and the second input/exhaust valve 154, respectively. Once the desired amount of fluid is injected into the pressure differential compressed fluid exchanger 110, the first input/exhaust valve 144 and the second input/exhaust valve 154 are closed. It is assumed that the first container 116 and the second container 118 are provided with fluid at substantially equal pressures whether or not the temperatures of the first container 116 and the second container 118 are equal. The pressure differential compressed fluid exchanger 110 is designed to require this fluid injection procedure only once, although additional injections or ventilations may be subsequently necessary as operating conditions dictate or to remedy the effects of normal wear and tear. This initial charging of the first container 116 and the second container 118 with compressed fluid is assumed to take place by 9:00 a.m. on this illustrative day. With the pressure regulating main control valve 152 closed, the compressed fluid within the first container 116 is isolated from the compressed fluid within the second container 118.

As this illustrative day progresses past 9:00 a.m., a differing percentage temperature change occurs as the temperature of the relatively volatile environment 170 rises from 275 degrees Kelvin to 290 degrees Kelvin while the and into the second container 118. As the compressed fluid flows through the turbine 120, the turbine shaft 124 coupled with the turbine 120 rotates. This rotating turbine shaft 124 can be coupled with a variety of energy producing devices well known in the art such as the electrical generator 166 to use the energy produced. Alternatively, the turbine shaft 124 can be connected to the energy storage apparatus 164 to produce and store the energy generated to be used at a later time. The fluid is assumed to flow until the difference in the pressure of the compressed fluid within in first container 116 compared to the pressure of the compressed fluid within the second container 118 is no longer sufficient to operate the motive power source. The pressure regulating main control valve 152 is subsequently closed to mark the end of the compressed fluid exchange cycle. It is assumed that this aforementioned compressed fluid exchange takes place between 2:00 p.m. and 9:00 p.m. on this illustrative day.

As discussed, with the rotation of the turbine 120, the aforementioned hypothetical compressed fluid exchange would result in the generation of energy. In order to approximate this energy generation, several assumptions are employed. It is assumed that this compressed fluid within the first container 116 and the second container 118 could behave consistent with PV=nRT. It is assumed that the beginning pressures of the compressed fluid within the first container 116 and the compressed fluid within the second container 118 could be approximately 20 million newtons per square meter each. It is assumed that the useful internal volumes within the first container 116 and the second container 118 could be designed at approximately 20 cubic meters and approximately 80 cubic meters, respectively. It is assumed that any expansion or contraction of the first container 116 or the second container 118 throughout the range of pressures and temperatures employed in this approximation would be insignificant. That is, it is assumed that the first container 116 and the second container 118 could maintain approximately constant useful internal volumes. It is assumed that the aforementioned rise in temperature of the first environment 170 from 275 degrees Kelvin to 290 degrees Kelvin would result in an increase in the temperature of the compressed fluid within the first container 116, in turn, to approximately 290 degrees Kelvin, with an assumed corresponding pressure increase from approximately 20 million newtons per square meter to approximately 21.1 million newtons per square meter. It is assumed that the turbine 120 would require a threshold pressure differential of approximately 100 thousand newtons per square meter to allow a compressed fluid exchange to initiate. An approximate like amount of pressure differential is assumed to remain when the pressure differential is no longer sufficient to operate the turbine 120 and, therefore, the compressed fluid exchange would end. Under these assumptions and all other things held constant, it is assumed that, once initiated, the aforementioned hypothetical compressed fluid exchange would continue until the pressures of the compressed fluid within the first container 116 and the compressed fluid within the second container 118 approximate 20.3 million newtons per square meter and 20.2 million newtons per square meter, respectively, resulting in approximately 4.4 kilowatt-hours of energy passing to the turbine 120.

As this illustrative day progresses past 9:00 p.m., a differing percentage temperature change occurs as the temperature of the relatively volatile environment 170 decreases from 290 degrees Kelvin to 275 degrees Kelvin, while the temperature of the relatively stable environment 180 remains at 290 degrees Kelvin. It is assumed that this second differing percentage temperature change takes place between 9:01 p.m. and 1:59 a.m. on this illustrative day. It is assumed that this differing percentage temperature change results in a pressure differential between the compressed fluid within the first container 116 relative to the compressed fluid within the second container 118. More particularly, in this case, it is assumed that the pressure of the compressed fluid within the first container 116 will be less than the pressure of the compressed fluid within the second container 118. It is assumed that the pressure differential is sufficient to operate the motive power source. Similar to that described previously, the computer controller 162 opens the pressure regulating main control valve 152 and compressed fluid flows from the container of relatively higher pressure to the container of relatively lower pressure. In this case, compressed fluid flows from the second container 118 through the turbine 120 and into the first container 116. As before, as the compressed fluid flows through the turbine 120, the turbine shaft 124 rotates, generating energy. The fluid is assumed to flow until the difference in the pressure of the compressed fluid within the first container 116 compared to the pressure of the compressed fluid within the second container 118 is no longer sufficient to operate the motive power source. The pressure regulating main control valve 152 is again closed to mark the end of this second compressed fluid exchange cycle. It is assumed that this second compressed fluid exchange takes place between 2:00 a.m. and 8:59 a.m. on this illustrative day.

No fluid is vented to the atmosphere as a result of the operations of the pressure differential compressed fluid exchanger 110 during the illustrative day. That is, compressed fluid cycles back and forth between the first container 116 and the second container 118, depending on the direction of the built-up pressure differential, but does not escape the system.

This illustrative day is not meant to encompass all operating scenarios in which the pressure differential compressed fluid exchanger 110 will function. Moreover, the above approximation of the assumed hypothetical compressed fluid exchange is not meant to encompass the entire range of energy generation theoretically attainable from the operations of this invention.

To permit energy generated from a compressed fluid exchange cycle to be used at a later time, energy storage apparatus 164 is coupled to the turbine 120 via the turbine shaft 124. Turbine 120, when operating, powers an air compressor 182 and the third fluid coupler 186 directs ambient-sourced compressed air into the third container 184. The third container 184 need not be partially underground as illustrated in FIG. 3. The resulting compressed air in the third container 184 can be utilized, when desired, to drive the second turbine 194. The second turbine shaft 196 of the second turbine 194 is coupled to generator 166 to produce electricity. The second computer controller 188 is included for control of the release valve 190. When desired, whether automatic or via manual override, the second computer controller 188 opens the release valve 190 and, providing the pressure within the third container 184 is of sufficient magnitude, the compressed air flows from the third container 184 through the fourth fluid coupler 192 through the second turbine 194. As the compressed air flows through the second turbine 194, the second turbine shaft 196 coupled with the second turbine 194 rotates. This rotating second turbine shaft 196 can be coupled with a variety of energy producing devices well known in the art such as the electrical generator 166 to use the energy produced. It is understood that the energy storage apparatus 164 could, alternatively, be the same energy storage apparatus shown in FIG. 1.

The relatively temperature volatile environment 170 is surrounded by the rotatable solar oven enclosure 172. This rotatable solar oven enclosure 172 serves, when closed, to allow the penetration of sunlight and the related capture of heat within the relatively temperature volatile environment 170, or, when opened, the venting of the relatively temperature volatile environment 170. The solar concentrator 178 is used to direct additional available sunlight toward the relatively temperature volatile environment 170. The heat radiant material 198 is placed around and underneath the first container 116 to provide a surface of heat radiation from ambient heat and available sunlight on and around the first container 116. The heat radiant material 198 is insulated from the ground 112 with intermediate insulation layer 199.

This alternative embodiment has been illustrated with a subsurface disposition for the second container 118 providing for the relatively temperature stable environment 180. It is understood that any means to provide for such relative temperature stability can be used, such as an aboveground disposition without a solar oven or with insulation.

It was described that the first container 116 and the second container 118 are filled independently through the first input/exhaust valve 144 and the second input/exhaust valve 154, respectively. Alternatively, either the first input/exhaust valve 144 or the second input/exhaust valve 154 can be used to fill both the first container 116 and the second container 118, provided the pressure regulating main control valve 152 is open. However, the beginning pressures in the first container 116 and the second container 118 may not reach equilibrium based on the pressure differential threshold needed to operate the motive power source.

Figure 4:
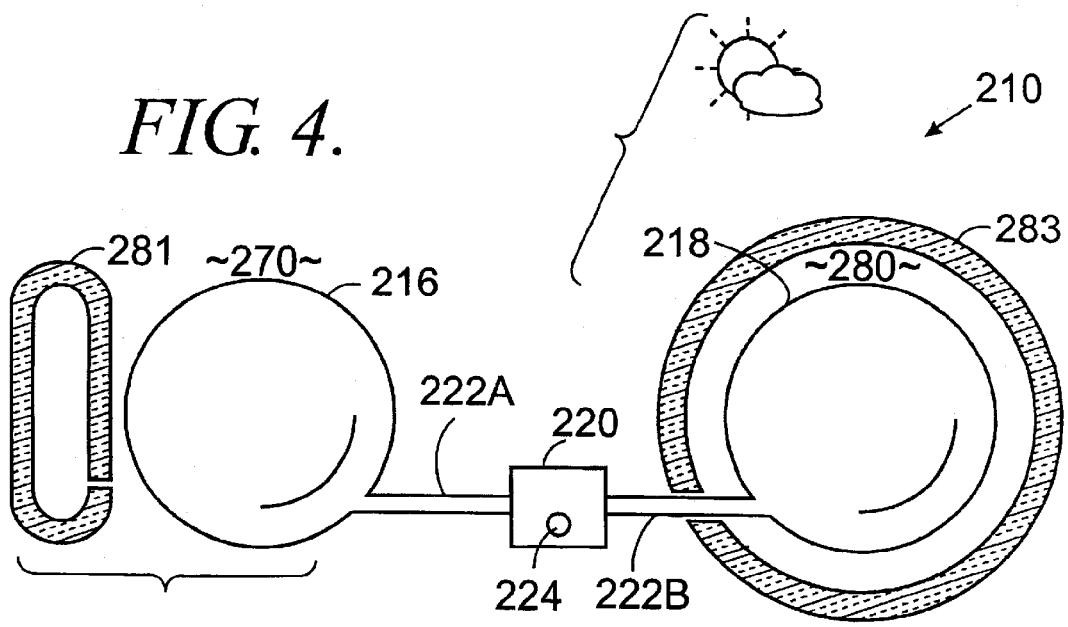
FIG. 4 is a schematic view of another alternative embodiment of the invention showing removable insulation provided for exterior coverage of first and second containers.

Referring now to FIG. 4, the differential compressed fluid exchanger according to another alternative embodiment of the present invention is designated generally by the numeral 210. This alternative embodiment pressure differential compressed fluid exchanger 210 comprises a first container 216, a second container 218, and a turbine 220 coupled with the first container 216 by a first fluid coupler 222A and with the second container 218 by a second fluid coupler 222B. The motive power source comprises a turbine 220 and is coupled to a turbine shaft 224. The first container 216 and the second container 218 can include exterior and interior heat conducting skins and optional heat transfer appendages similar to the preferred embodiment and the alternative embodiment illustrated in FIG. 3 but not shown in FIG. 4. The first container 216 and the second container 218 reside in a first environment 270 and a second environment 280, respectively. This alternative embodiment pressure differential compressed fluid exchanger 210 includes first removable insulation 281 for use around the first container 216 and second removable insulation 283 for use around the second container 218. Although not shown, the various controls, valves, and monitoring equipment described in the preferred embodiment and the alternative embodiment illustrated in FIG. 3 are equally applicable to this alternative embodiment pressure differential compressed fluid exchanger 210. Similarly, the solar oven enclosures and solar concentrators previously described can be used but are not shown in order to emphasize the distinguishing characteristic of this alternative embodiment pressure differential compressed fluid exchanger 210.

In operation, this alternative embodiment pressure differential compressed fluid exchanger 210 of the invention uses removable insulation to provide dissimilar exposure for the first container 216 and the second container 218 to daily ambient temperature changes and available solar energy to create disparate percentage temperature fluctuations. These disparate percentage temperature changes between the respective containers result in pressure differentials that urge a flow of compressed fluid to drive the turbine 220, generating energy.

It is assumed that the compressed fluid flows during each compressed fluid exchange cycle until the difference in the pressure of the compressed fluid within in first container 216 compared to the pressure of the compressed fluid within the second container 218 is no longer sufficient to operate the motive power source.

An example begins at daybreak, and as illustrated in FIG. 4, with the second removable insulation 283 positioned around the second container 218 to insulate the second environment 280, and more particularly, the second container 218 from the daily ambient heating cycle and exposure to the Sun, and the first removable insulation 281 removed from the first container 216 to allow for exposure of the first environment 270, and more particularly, the first container 216, to daily ambient heating and exposure to the Sun. It is assumed that while the first removable insulation 281 and the second removable insulation 283 are in place around the first environment 270 and the second environment 280, respectively, that such first removable insulation 281 and such second removable insulation 283 provide temperature stability within the first container 216 and the second container 218, respectively. As the ambient heating cycle progresses, the first environment 270, and in turn, the compressed fluid within the first container 216, experiences a rise in temperature. During the same period of time, in accordance with the assumption previously stated, the temperature of the compressed fluid within the second container 218 remains steady. It is assumed that this differing percentage temperature change results in a pressure differential between the compressed fluid within the first container 216 relative to the compressed fluid within the second container 218. More particularly, in this case, the pressure of the compressed fluid within the first container 216 will be greater than the pressure of the compressed fluid within the second container 218. It is assumed that the pressure differential is sufficient to operate the motive power source. Similar to that described in the previous embodiments, the compressed fluid exchange cycle is begun and compressed fluid flows from the container of relatively higher pressure to the container of relatively lower pressure. In this case, compressed fluid flows from the first container 216 through the turbine 220 and into the second container 218. As the compressed fluid flows through the turbine 220, the turbine shaft 224 rotates, generating energy. This rotating turbine shaft 224 can be coupled with a variety of energy producing devices well known in the art. Similarly to that discussed in the previous embodiments, the compressed fluid exchange cycle is then ended.

It is assumed that sufficient time exists within the ambient heating cycle to generate an additional disparate percentage temperature fluctuation and compressed fluid exchange. The first removable insulation 281 is positioned around the first container 216 to preserve the temperature of the first environment 270, and more particularly, the temperature of the compressed fluid within the first container 216. The second removable insulation 283 is removed from the second container 218 to allow for exposure of the second environment 280, and more particularly, the second container 218, to ambient heating and exposure to the Sun. As the ambient heating cycle remains, the second environment 280, and in turn, the compressed fluid within the second container 218, experiences a rise in temperature. During the same period of time, in accordance with the assumption previously stated, the temperature of the compressed fluid within the first container 216 remains steady. It is assumed that this differing percentage temperature change results in a pressure differential between the compressed fluid within the first container 216 relative to the compressed fluid within the second container 218. More particularly, in this case, it is assumed that the pressure of the compressed fluid within the first container 216 will be less than the pressure of the compressed fluid within the second container 218. It is assumed that the pressure differential is sufficient to operate the motive power source. Similar to that described previously, the compressed fluid exchange cycle is begun and compressed fluid flows from the container of relatively higher pressure to the container of relatively lower pressure. In this case, compressed fluid flows from the second container 218 through the turbine 220 and into the first container 216. As the compressed fluid flows through the turbine 220, the turbine shaft 224 rotates, generating energy. Similarly to that discussed previously, this second compressed fluid exchange cycle is then ended.

As daytime gives way to nighttime and the ambient heating cycle gives way to cooling, the second environment 280, and in turn, the compressed fluid within the second container 218, experiences a decrease in temperature. During the same period of time, in accordance with the assumption previously stated, the temperature of the compressed fluid within the first container 216 remains steady. It is assumed that this differing percentage temperature change results in a pressure differential between the compressed fluid within the first container 216 relative to the compressed fluid within the second container 218. More particularly, in this case, it is assumed that the pressure of the compressed fluid within the first container 216 will be greater than the pressure of the compressed fluid within the second container 218. It is assumed that the pressure differential is sufficient to operate the motive power source. Similar to that described previously, the compressed fluid exchange cycle is begun and compressed fluid flows from the container of relatively higher pressure to the container of relatively lower pressure. In this case, compressed fluid flows from the first container 216 through the turbine 220 and into the second container 218. As the compressed fluid flows through the turbine 220, the turbine shaft 224 rotates, generating energy. Similar to that described previously, this third compressed fluid exchange cycle is then ended.

It is assumed that sufficient time exists within the ambient cooling cycle to generate an additional disparate percentage temperature fluctuation and compressed fluid exchange. The second removable insulation 283 is positioned around the second container 218 to preserve the temperature of the second environment 280, and more particularly, the temperature of the compressed fluid within the second container 218. The first removable insulation 281 is removed from the first container 216 to allow for exposure of the first environment 270, and more particularly, the first container 216, to ambient cooling. As the ambient cooling cycle remains, the first environment 270, and in turn, the compressed fluid within the first container 216, experiences a decrease in temperature. During the same period of time, in accordance with the assumption previously stated, the temperature of the compressed fluid within the second container 218 remains steady. All other things held constant, this differing percentage temperature change results in a pressure differential between the compressed fluid within the first container 216 relative to the compressed fluid within the second container 218. More particularly, in this case, it is assumed that the pressure of the compressed fluid within the first container 216 will be less than the pressure of the compressed fluid within the second container 218. It is assumed that the pressure differential is sufficient to operate the motive power source. Similar to that described previously, the compressed fluid exchange cycle is begun and compressed fluid flows from the container of relatively higher pressure to the container of relatively lower pressure. In this case, compressed fluid flows from the second container 218 through the turbine 220 and into the first container 216. As the compressed fluid flows through the turbine 220, the turbine shaft 224 rotates, generating energy. Similar to that described previously, this fourth compressed fluid exchange cycle is then ended.

Figure 5:
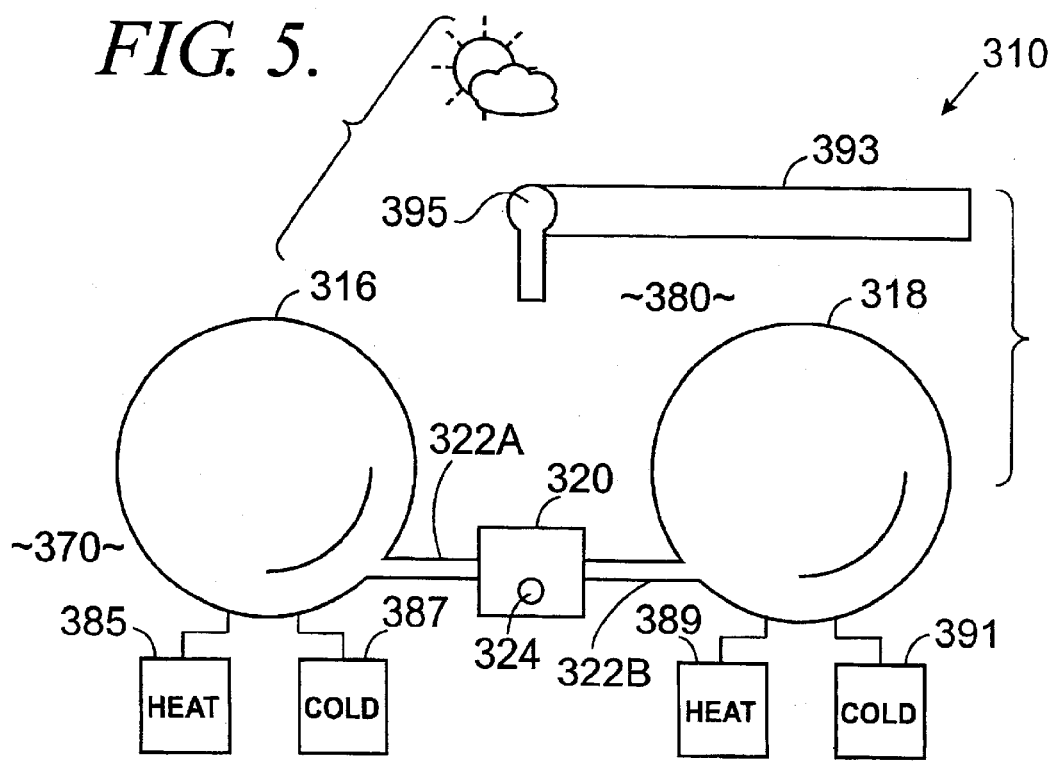
FIG. 5 is a schematic view of another alternative embodiment of the invention wherein two containers are located so that, on an alternating basis, one container is exposed to natural sunlight and/or a man-made heating environment while the other container is exposed to a man-made cooling environment with insulation from exposure to the Sun.

Referring now to FIG. 5, the differential compressed fluid exchanger according to another alternative embodiment of the present invention is designated generally by the numeral 310. This alternative embodiment pressure differential compressed fluid exchanger 310 comprises a first container 316, a second container 318, and a motive power source 320 coupled with the first container 316 by a first fluid coupler 322A and with the second container 318 by a second fluid coupler 322B. The motive power source 320 is coupled to a motive power source shaft 324. The first container 316 and the second container 318 can include exterior and interior heat conducting skins and optional heat transfer appendages similar to the preferred embodiment and the alternative embodiment illustrated in FIG. 3 but not shown in FIG. 5. The first container 316 and the second container 318 reside in a first environment 370 and a second environment 380, respectively. This alternative embodiment pressure differential compressed fluid exchanger 310 includes man-made heating and cooling sources as follows; a first man-made heating source 385, a first man-made cooling source 387, a second man-made heating source 389, and a second man-made cooling source 391. An optional shade 393 movable by prime mover 395 is included to shield, as desired, either the first container 316 or the second container 318 from exposure to the Sun. Although not shown, the various controls, valves, and monitoring equipment described in the preferred embodiment and the alternative embodiment illustrated in FIG. 3 are equally applicable to this alternative embodiment pressure differential compressed fluid exchanger 310. Similarly, the solar oven enclosures and solar concentrators previously described can be used but are not shown in order to emphasize the distinguishing characteristic of this alternative embodiment pressure differential compressed fluid exchanger 310.

In operation, this alternative embodiment pressure differential compressed fluid exchanger 310 of the invention provides dissimilar environmental exposure for the first container 316 and the second container 318 such that, on an alternating basis, one container is exposed to natural sunlight and a man-made heating source while the other container is exposed to a man-made cooling source with insulation from exposure to the Sun. This disparate exposure to solar and man-made heating and cooling environments is used to induce differing percentage temperature fluctuations between the respective containers, and in turn, pressure differentials to urge a flow of compressed fluid to drive the motive power source 320, generating energy.

It is assumed that the compressed fluid flows during each compressed fluid exchange cycle until the difference in the pressure of the compressed fluid within in first container 316 compared to the pressure of the compressed fluid within the second container 318 is no longer sufficient to operate the motive power source 320.

An example begins with the optional shade 393 positioned as illustrated in FIG. 5 above the second container 318 to shade the second container 318 from exposure to the Sun. The first man-made heating source 385 is activated, causing a rise in temperature in the first environment 370, and in turn, within the first container 316. The second man-made cooling source 391 is activated, causing a decrease in temperature in the second environment 380, and in turn, within the second container 318. It is assumed that this differing percentage temperature change results in a pressure differential between the compressed fluid within the first container 316 relative to the compressed fluid within the second container 318. More particularly, in this case, the pressure of the compressed fluid within the first container 316 will be greater than the pressure of the compressed fluid within the second container 318. It is assumed that the pressure differential is sufficient to operate the motive power source 320. Similar to that described in the previous embodiments, the compressed fluid exchange cycle is begun and compressed fluid flows from the container of relatively higher pressure to the container of relatively lower pressure. In this case, compressed fluid flows from the first container 316 through the motive power source 320 and into the second container 318. As the compressed fluid flows through the motive power source 320, the motive power source shaft 324 operates, generating energy. This operating motive power source shaft 324 can be coupled with a variety of energy producing devices well known in the art. Similar to that described in the previous embodiments, the compressed fluid exchange cycle is then ended.

The prime mover 395 is used to move the optional shade 393 such that the optional shade 393 is repositioned above the first container 316 to shade the first container 316 from exposure to the Sun. The first man-made heating source 385 is deactivated and the first man-made cooling source 387 is activated, causing a decrease in temperature in the first environment 370, and in turn, within the first container 316. The second man-made cooling source 391 is deactivated and the second man-made heating source 389 is activated, causing an increase in temperature in the second environment 380, and in turn, within the second container 318. All other things held constant, this differing percentage temperature change results in a pressure differential between the compressed fluid within the first container 316 relative to the compressed fluid within the second container 318. More particularly, in this case, it is assumed that the pressure of the compressed fluid within the first container 316 will be less than the pressure of the compressed fluid within the second container 318. It is assumed that the pressure differential is sufficient to operate the motive power source 320. Similar to that described previously, the compressed fluid exchange cycle is begun and compressed fluid flows from the container of relatively higher pressure to the container of relatively lower pressure. In this case, compressed fluid flows from the second container 318 through the motive power source 320 and into the first container 316. As the compressed fluid flows through the motive power source 320, the motive power source shaft 324 operates, generating energy. Similar to that described previously, this second compressed fluid exchange cycle is then ended.

This operational methodology may be used to create multiple fluid exchange cycles per day.

Although not illustrated, a computer controller could be linked to the prime mover 395 to control the positioning of the optional shade 393.

Although the invention has been described with reference to four embodiments illustrated in the attached drawing figures, it is noted that substitutions may be made and equivalents employed herein without departing from the scope of the invention as recited in the claims. For example, although the alternative embodiment illustrated in FIG. 3 is illustrated and described as having a subsurface tank, it is understood that other variations of containers such as natural or man made caverns may be employed without departing from the present invention. Moreover, the size and shape of the compressed fluid containers, whether individually or relative to each other, as well as the materials used for their construction, such as high-yield steel or tempered glass, is optional. Further, the containers need not be rigid but rather may be flexible or semi-flexible bladders or otherwise allow for expansion or contraction. The containers could be transparent, translucent, or opaque as operating conditions require. The containers may include an internal support structure or contain other materials or liquids. The compressed fluid inside of the containers can be agitated or circulated by fans to expedite the transfer of heat from the containers to the compressed fluid contained therein and visa a versa. The exterior and interior heat conducting skins may be designed of any suitable material, such as but not limited to copper or paint. Depending on the materials used for construction of the containers and their respective expansion coefficients, it is anticipated that the containers overall size or volume may vary with temperature and contained pressure, which may, in turn, have an impact on the pressure of the contained fluid. Other ways to direct light toward or onto the containers such as magnifying devices or other light-focusing or reflecting devices are anticipated by the present invention. The solar oven enclosures can be fashioned of any suitable materials that allow for the penetration of sunlight and related capture of heat, such as glass or translucent plastic. Moreover, the solar oven enclosure could be designed for relocation, as desired, from around one container to around the other container. Alternatively, the primary purpose of the solar oven, that of the capture and retention of heat, may be accomplished without the capture of direct sunlight, such as within the attic space of a home. Man-made heating and cooling sources may include waste heat or cooling.

Any natural or man-made means for using temperature fluctuations to cause a pressure differential between at least two containers can be employed without departing from the present invention. One container could be insulated while the other is not. Removable insulation may be provided for either (or both) of the containers when desiring to preserve the internal temperature of such container or otherwise protect the internal temperature from the environment in which the container is disposed. The relative environments provided for the two or more coupled containers need not be necessarily relatively warm or cool, only that the containers experience periodic temperature changes of a differing percentage magnitude or direction. Any relative dispositions provided for the containers, whether involving exposure to or insulation from any natural or man-made heating or cooling sources may accomplish this goal and are anticipated. Any means to alternate either the dispositions of the respective containers or their respective environmental exposure may accomplish the goal of attempting a greater frequency of differing percentage temperature fluctuations.

The energy storage apparatus may encompass fuel cells, capacitors, flywheels, hydraulic energy storage devices, or organic energy storage devices as well as any other apparatus known in the art or developed at a later time to store energy.

The invention is not limited to using compressed gas, but can utilize any compressible medium including a compressible mixture of gas and liquid. The term fluid as used herein should be understood to encompass any such medium including a gas or gas liquid mixture. The motive power source may be a turbine, a generator, a hydraulic pump, a wind machine, a lift, or a compressor or any other apparatus that can generate energy using pressure or a moving fluid or compressible liquid flow path. For possible greater efficiencies, separate motive power sources, flow paths, and related control valves may be employed for each fluid flow direction. That is, one motive power source may be utilized for a fluid flow from a first container to a second container, while a separate motive power source may be utilized for fluid flows from the second container to the first container. Direct use of the motive power generated is anticipated.

While various embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What the invention claimed is:

1. Apparatus for generating energy comprising:
   first and second containers to contain fluid under pressure;
   a first pressure-determining component to determine a pressure in one of said first or second containers;
   a motive power source coupled with the first and second containers and operable to generate energy in response to a flow of the fluid from said first container to said second container and operable to generate energy in response to a flow of the fluid from said second container first container,
   wherein fluid flow between the containers is urged by a difference in the pressure of the fluid within the first container compared to the pressure of the fluid within the second container, and
   wherein said difference in pressure is caused by a change in temperature of fluid in said first or second container of a different percentage than a change, if any, in temperature of fluid in the other container; and
   a valve positioned between the first and second containers and operable to control the flow of the fluid between the first and second containers.

2. The apparatus of claim 1, wherein said first pressure-determining component comprises a port for receiving a pressure gauge.

3. The apparatus of claim 2, further comprising a second pressure-determining component for determining the pressure of the fluid within the other of said first or second containers.

4. The apparatus of claim 3, wherein the fluid is a gas or a combination of gas & liquid, including a vapor.

5. The apparatus of claim 4, further comprising a controller logically coupled with: (1) the first pressure-determining component, (2) the second pressure-determining component, and with (3) the valve to control a cycling of fluid exchanges between the first and second containers.

6. The apparatus of claim 4, further comprising:
   a first temperature gauge for monitoring the temperature of the fluid within the first container;
   a first pressure-relief valve for venting fluid from the first container;
   a second temperature gauge for monitoring the temperature of the fluid within the second container; and
   a second pressure-relief valve for venting fluid from the second container.

7. The apparatus of claim 4, wherein the first container is subjected to a first environment for bringing the fluid in the first container to a first pressure.

8. The apparatus of claim 4, wherein the first environment comprises an area that warms the fluid in the first container.

9. The apparatus of claim 8, wherein the area that warms the fluid in the first container further comprises a solar oven.

10. The apparatus of claim 9, wherein the solar oven comprises a glass enclosure.

11. The apparatus of claim 10, wherein the glass enclosure comprises an array of rotatable heat-managing panels.

12. The apparatus of claim 9, further comprising a solar oven prime mover for physically manipulating the solar oven.

13. The apparatus of claim 8, wherein the first environment further comprises a heating source.

14. The apparatus of claim 7, wherein the second container is subjected to a second environment for bringing the fluid in the second container to a second pressure.

15. The apparatus of claim 14, wherein is included a first removable layer of exterior insulation at least partially surrounding the second container.

16. The apparatus of claim 14, wherein the second environment further comprises a cooling source.

17. The apparatus of claim 14, wherein the first container further comprises an exterior heat-conducting skin.

18. The apparatus of claim 17, wherein the exterior heat-conducting skin comprises a metallic skin.

19. The apparatus of claim 17, wherein the second container further comprises an exterior heat-conducting skin.

20. The apparatus of claim 4, wherein the second container has a volume at least 1.5 times that of the first container.

21. The apparatus of claim 4, further comprising an energy-storage apparatus coupled with the first motive power source.

22. The apparatus of claim 21, wherein the energy storage apparatus comprises:
   a generator coupled to the motive power source; and
   a battery coupled to the generator.

23. The apparatus of claim 21, wherein the energy-storage apparatus comprises:
   a third container;
   a compressor coupled with the motive power source and with the third container to compress ambient-sourced air into the third container in response to stimulation of the motive power source; and
   a second motive power source coupled to the third container to produce energy in response to a decompression of the third container.

24. The apparatus of claim 4, wherein the motive power source comprises a turbine.

25. The apparatus of claim 4, wherein is included a second removable layer of insulation at least partially surrounding the first container.

26. The apparatus of claim 25, wherein is include a third removable layer of insolation at least partially surrounding the second container.

27. The apparatus of claim 14, wherein is included:
   a structural support for the first and second containers; and
   a prime mover for alternating the containers between the first and second environments.

28. The apparatus of claim 4, further comprising an input valve to allow for an injection of fluid into the first container.

29. A method for generating energy comprising;
   providing a first supply of fluid contained at a first pressure and a second supply of fluid contained at a second pressure;
   providing a first pressure-determining component for determining a pressure of the first or second supply;
   providing for the control of a flow of the fluid from said first supply to said second supply and from said second supply to said first supply; and
   generating energy as the fluid flows within the flow path between the first and second supplies in response to a difference in pressure between the first supply compared to the pressure of the second supply, and vice versa, wherein said difference in pressure is caused by a change in temperature of said first or second supply of fluid of a different percentage than a change, if any, in temperature of the other supply of fluid.

30. The method of claim 29, wherein the fluid is a gas or a combination of gas & liquid, including a vapor.

31. The method of claim 29, wherein said first pressure-determining component comprises a port for receiving a pressure gauge.

32. The method of claim 30, wherein the step of generating energy includes providing a motive power source within the flow-path that is stimulated in response to an exchange of fluid between the first and second supplies of contained fluid.

33. The method of claim 32, wherein providing a motive power source comprises providing a turbine.

34. The method of claim 30, further comprising the step of subjecting the first supply of fluid to a first environment for bringing the first supply to a different pressure than said first pressure.

35. The method of claim 34, wherein the step of subjecting the first supply of fluid to the first environment comprises subjecting the first supply to an energy source that warms the first supply.

36. The method of claim 34, wherein the step of subjecting the first supply of fluid to the first environment includes enhancing the effect of the first environment by concentrating the energy from the first environment on the first supply.

37. The method of claim 34, further comprising the step of subjecting the second supply of fluid to a second environment for bringing the second supply to a second pressure.

38. The method of claim 37, wherein subjecting the second supply to the second environment comprises subjecting the second supply to a cooling source.

39. The method of claim 37, wherein the step of subjecting the second supply of fluid to the second environment includes providing a source of removable insulation at least partially surrounding the second supply of fluid.

40. The method of claim 30, further comprising:
providing a structural support for interchangeably supporting the first and second supplies;
providing a prime mover for alternating the supplies between first and second environments; and
moving the supplies between the first and second environments whereby the frequency of fluid exchanges can be increased.

41. The method of claim 30, further comprising coupling an energy-storage apparatus to the first motive power source.

42. The method of claim 32, further comprising coupling a controller with the first pressure-determining component and with the valve for controlling a cycling of fluid between the first and second supplies.

43. The method of claim 42, further comprising:
providing a first temperature gauge for monitoring the temperature of the first supply; and
providing a second temperature gauge for monitoring the temperature of the second supply.

44. The method of claim 30, further comprising providing an input valve to allow for an injection of fluid into the first or second container.

45. Apparatus for generating energy comprising:
first and second containers to contain fluid under pressure;
a first pressure-determining component to determine a pressure in one of said first or second containers; and
a first motive power source coupled with the first and second containers, wherein the first motive power source,
(1) is a rotary device, and
(2) generates energy in response to a flow of the fluid from said first container to said second container and also generates energy in response to a flow of the fluid from said second container to said first container, said flow urged by a difference in the pressure of the fluid within the first container compared to the pressure of the fluid within the second container, wherein said difference in pressure is caused by a change in temperature of fluid in said first or second container of a different percentage than a change, if any, in temperature of fluid in the other container.

46. The apparatus of claim 45, wherein the fluid is a gas or a combination of gas & liquid, including a vapor.

47. The apparatus of claim 46, further comprising a valve between the first and second containers to control the flow of the fluid between the first and second containers.

48. The apparatus of claim 47, wherein said first pressure-determining component comprises a port for receiving a pressure gauge.

49. The apparatus of claim 48, further comprising a second pressure-determining component for determining the pressure of the fluid within the other of said first or second containers.

50. The apparatus of claim 49 further comprising a controller logically coupled with: the first pressure-determining component and with the valve to control a cycling of fluid exchanges between the first and second containers.

51. The apparatus of claim 50, wherein the first container is subjected to a first environment for bringing the fluid in the first container to a first pressure.

52. The apparatus of claim 51, wherein the second container is subjected to a second environment for bringing the fluid in the second container to a second pressure.

53. The apparatus of claim 52, further comprising an energy-storage apparatus coupled to the motive power source.

54. The apparatus of claim 52, further comprising a prime mover for alternating the containers between the first and second environments.

55. Apparatus for generating energy comprising:
a first containment of fluid under pressure;
a second containment of fluid under pressure coupled to the first containment, thereby defining a flow path between the first containment and the second containment;
a first pressure-determining component to determine a pressure of one of said first or second containments; and
a motive power source disposed within the flow path, wherein the motive power source is operable to generate energy in response to a flow of the fluid from the first containment to the second containment and operable to generate energy in response to a flow of the fluid from the second containment to the first containment wherein said flow is urged by a pressure difference between the first and second containments caused by a change in temperature of said first or second containment of a different percentage than a change, if any, in temperature of the other containment.

56. The apparatus of claim 55, wherein the fluid is a gas or a combination of gas & liquid, including a vapor.

57. The apparatus of claim 56, wherein the first containment, flow path, and second containment define a substantially closed system where the fluid is substantially recycled between the first and second containments.

58. The apparatus of claim 57, wherein said first and second containments are interchangeable such that containment temperatures relative to each other can be interposed.

59. Apparatus for generating energy comprising:
a first containment of fluid under pressure and associated with a first temperature;
a second containment of fluid under pressure coupled to the first containment, thereby defining a flow path between the first containment and the second containment, and wherein the second containment of fluid is associated with a second temperature that is cooler than the first temperature;
a first pressure-determining component to determine a pressure of one of said first or second containments; and
a motive power source coupled to said first and second containments operable to generate energy in response to a flow of the fluid from said first containment to said second containment and is operable to generate energy in response to a flow from said second containment to said first containment,
wherein fluid flow is urged by a pressure difference between the first and second containments caused by a change in temperature of said first or second containment of a different percentage than a change, if any, in temperature of the other containment, and further
wherein the second temperature becomes warmer than the first temperature incident to subjecting the first or second containments to an environment that changes the temperature of the first or second containments.

60. The apparatus of claim 59, wherein the fluid is a gas or a combination of gas & liquid, including a vapor.

61. The apparatus of claim 60, wherein said first and second containments are interchangeable such that said first and second temperatures relative to each other can be interposed so that either containment may become cool or warm with respect to the other containment.

62. A method for providing energy characterized by a cyclical exchange of fluid between first and second containers, the method comprising;
providing a first containment of fluid at a first pressure and a first temperature;
providing a second containment of fluid at a second pressure and a second temperature, wherein the second temperature is relatively cooler than the first temperature;
providing a first pressure-determining component for determining a pressure of the first or second containment;
enabling a flow of fluid from the first containment to the second containment until the first and second pressures differ by a threshold amount, wherein the flow of fluid stimulates a motive power source to produce energy; and
exposing either the first containment or the second containment to an environment that causes the second temperature to become relatively warmer than the first temperature, thereby regenerating a pressure differential greater than the threshold amount that can be used to induce a subsequent fluid exchange from the second containment to the first containment.

63. The apparatus of claim 62, wherein the fluid is a gas or a combination of gas & liquid, including a vapor.

64. Apparatus for generating energy comprising:
first and second containers to contain fluid under pressure at first and second respective temperatures; and
a motive power source coupled with the first and second containers and operable to generate energy in response to a flow of the fluid from said first container to said second container and operable to generate energy in response to a flow of the fluid from said second container to said first container urged by a difference in the pressure of the fluid within the first container compared to the pressure of the fluid within the second container,
wherein said difference in pressure is caused by a change in temperature of fluid in said first or second container of a different percentage than a change, if any, in temperature of fluid in the other container, and
wherein substantially all fluid that flows from the first container is recovered in the second container, and substantially all fluid that flows from the second container is recovered in the first container.

65. A substantially closed system for generating energy comprising:
first and second containers to contain fluid under pressure; and
a motive power source coupled with the first and second containers and operable to generate energy in response to a flow of the fluid from said first container to said second container as well as from said second container to said first container urged by a difference in the pressure of the fluid within the first container compared to the pressure of the fluid within the second container,
wherein said difference in pressure is caused by a change in temperature of fluid in said first container of a different percentage than a change, if any, in temperature of fluid in said second container, and
wherein substantially all fluid is maintained within the system as the fluid flows between the first and second containers.

66. A device for providing energy, comprising;
means for containing a first supply of fluid under pressure at a first temperature;
means for determining a first pressure associated with said first supply of fluid;
means for containing a second supply of fluid under pressure at a second temperature; and
means for generating energy in response to a flow of fluid from said first container to said second container as well as from said second container to said first container urged by a difference in the pressure of said first supply compared to the pressure of said second supply induced by a change in said first or second temperature of a different percentage than a change, if any, in the other temperature.

67. The device of claim 66, further comprising means for determining a second pressure associated with said second supply of fluid.

68. A method for generating energy comprising:
providing first and second containers to contain fluid under pressure, wherein cyclical pressure differentials between the fluid within said first container and the fluid within said second container can be provided by exposing said first container to oscillating temperatures;
providing a motive power source coupled with said first and second containers and operable to generate energy in response to flows of the fluid from said first container to said second container and operable to generate energy in response to flows of the fluid from said second container to said first container, said flows urged by said pressure differentials.

69. A method for generating energy comprising:

providing first and second containers to contain fluid under pressure;

subjecting said first container to oscillating temperatures resulting in cyclical pressure differentials between the fluid within said first container and the fluid within said second container;

stimulating a motive power source coupled with said first and second containers to generate energy in response to cyclical flows of the fluid from said first container to said second container as well as from said second container to said first container urged by said cyclical pressure differentials, which are caused by changes in temperature of fluid in said first or second container of a different percentage than changes, if any, in temperature of fluid in the other container.

70. A method for generating energy in a system comprising first and second containers adapted to contain fluid under pressure and a motive power source coupled to said first and second containers, the method comprising:

bringing said first and second containers to a state whereby substantially no fluid flows between said first and second containers;

subjecting said first and second containers to environments that create a first pressure differential between said first and second containers;

enabling an exchange of fluid between said first and second containers urged by said first pressure differential that stimulates said motive power source to create energy until said first pressure differential is reduced to a different pressure differential from said first differential, thereby providing a first fluid-exchange cycle; and iteratively creating additional fluid-exchange cycles by:

(1) subjecting said first and second containers to environments that create another pressure differential between said first and second containers, (2) stimulating said motive power source by causing another fluid-exchange cycle using said another pressure differential until said another pressure differential reduces to a desired amount, wherein said fluid exchange cycle includes fluid flowing from said first container to said second container as well as from said second container to said first container, and wherein each of said pressure differentials is caused by changes in temperature of fluid in said first or second container of a different percentage than changes, if any, in temperature of fluid in the other container; and (3) repeating substeps (1) and (2).

71. A method for generating energy, comprising;

providing a first supply of contained fluid under pressure;

providing a second supply of contained fluid under pressure;

providing a valve within a flow path between the first and second supplies of contained fluid to control a flow of the fluid between the first and second supplies;

providing a first pressure-measuring device to determine the pressure of the first supply of contained fluid; and generating energy as fluid flows within the flow path from said first container to said second container as well as when fluid flows from said second container to said first container in response to a difference in pressure between the first supply compared to the pressure of the second supply, wherein said difference in pressure is caused by a change in temperature of said first or second supply of fluid of a different percentage than a change, if any, in temperature of the other supply of fluid.

* * * * *

UNITED STATES PATENT AND TRADEMARK OFFICE
CERTIFICATE OF CORRECTION

PATENT NO. : 6,959,546 B2  
APPLICATION NO. : 10/121783  
DATED : November 1, 2005  
INVENTOR(S) : Craig C. Corcoran It is certified that error appears in the above-identified patent and that said Letters Patent is hereby corrected as shown below:

Column 23,  
Line 13, add -- to said -- between "container" and "first".

Column 24,  
Line 38, change "include" to -- included --.  
Line 39, change "insolation" to -- insulation --.

Column 25,  
Line 6, change "flow-path" to -- flow path --.

Column 28,  
Line 60, add -- and -- after "temperatures;".

Column 30,  
Line 8, change "fluid exchange" to -- fluid-exchange --.

Signed and Sealed this

Twentieth Day of June, 2006

JON W. DUDAS  
*Director of the United States Patent and Trademark Office*